J. T. BLUFF.
ATTACHMENT FOR AUTOMOBILE RADIATORS.
APPLICATION FILED MAR. 25, 1921.

1,410,363.

Patented Mar. 21, 1922.

Inventor
J. T. Bluff
by Wilkinson & Gusto
Attorneys.

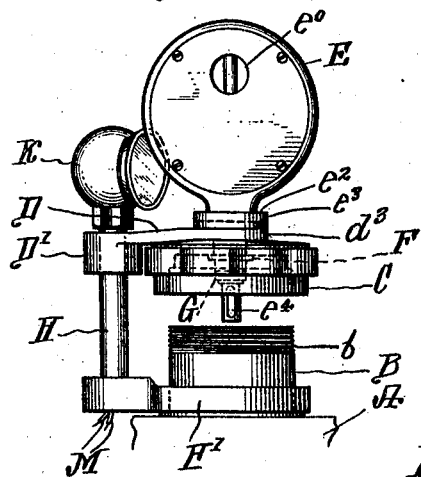
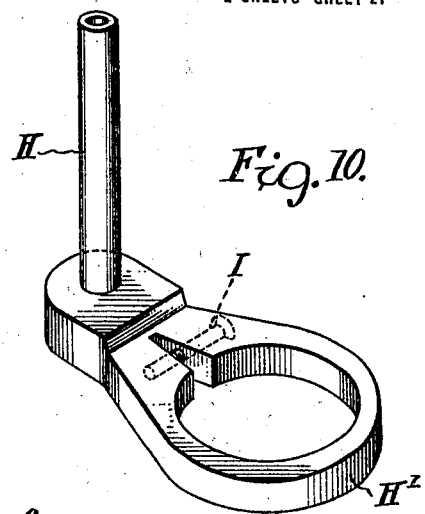
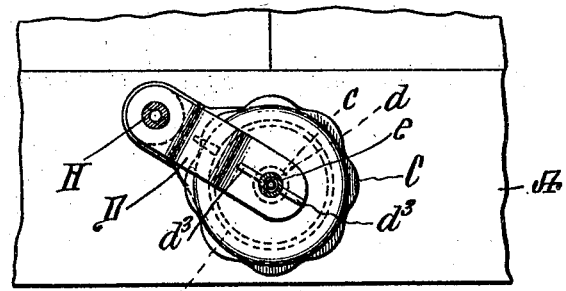
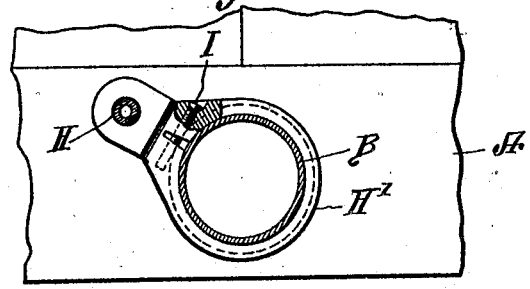
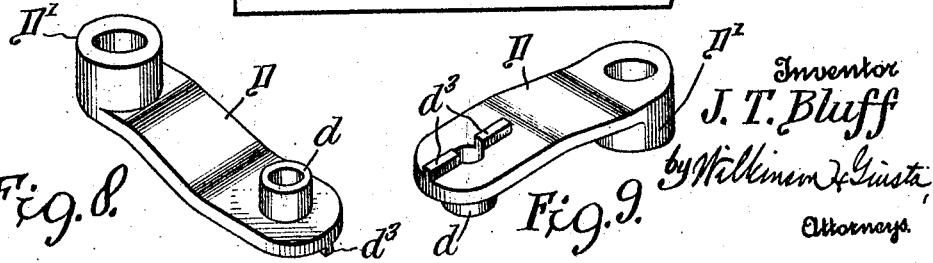

UNITED STATES PATENT OFFICE.

JOHN T. BLUFF, OF BUTTE, MONTANA.

ATTACHMENT FOR AUTOMOBILE RADIATORS.

1,410,363.    Specification of Letters Patent.    Patented Mar. 21, 1922.

Application filed March 25, 1921. Serial No. 455,554.

*To all whom it may concern:*

Be it known that I, JOHN THOMAS BLUFF, a citizen of the United States, residing at Butte, in the county of Silver Bow and State of Montana, have invented certain new and useful Improvements in Attachments for Automobile Radiators; and I do hereby declare the following to be a full, clear, and exact description of the invention, such as will enable others skilled in the art to which it appertains to make and use the same.

My present invention relates to improvements in attachments for automobile radiators, and it is intended to provide a convenient means for holding the cap of the radiator tank and the thermometer for showing the temperature of the radiator against accidental loss, theft, or injury incident to removal from the automobile.

With these attachments as at present most generally used, the cap and thermometer are removed when filling the tank of the radiator with liquid, and these are laid aside for the time being, and are apt to be forgotten, dropped in the snow or mud, or otherwise accidentally injured.

Furthermore, these thermometers are valuable, and are often stolen, and even the caps without the thermometers are frequently stolen or lost. It is to obviate such accidents or thefts that my present invention was designed.

The invention will be more fully understood after reference to the accompanying drawings, in which like parts are indicated by similar reference symbols throughout the several views, and in which:

Figure 5 is a similar view to Figure 2, but shows the cap and the thermometer attachment in the raised position before being swung clear of the filling opening in the radiator;

Figure 6 shows a section along the line 6—6 of Figure 2 and looking in the direction of the arrows;

Figure 7 shows a section along the line 7—7 of Figure 2 and looking in the direction of the arrows;

Figure 8 is a perspective view showing the swinging arm carrying the cap and thermometer, but in inverted position;

Figure 9 is a similar view to Figure 8, and shows the top of the same arm; and

Figure 10 is a perspective view of the supporting bracket.

Figure 1:
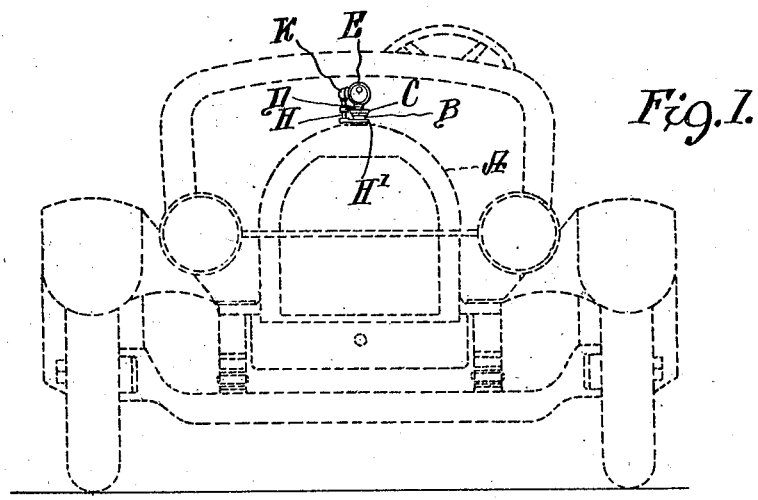
Figure 1 shows in dotted lines a front elevation of an automobile with the improved radiator attachment shown in full lines.
Figure 2:
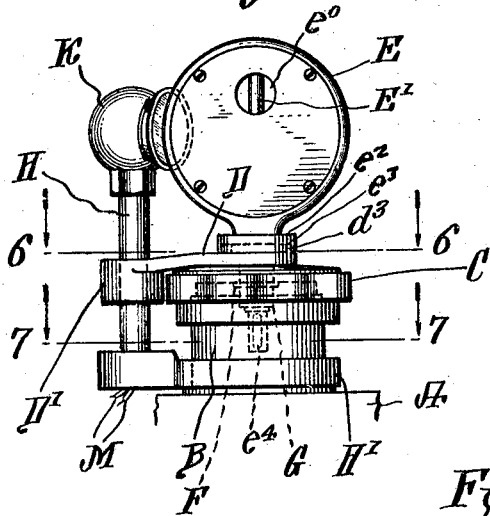
Figure 2 is a similar view to Figure 1, but shows the radiator attachment on a much larger scale.
Figure 4:
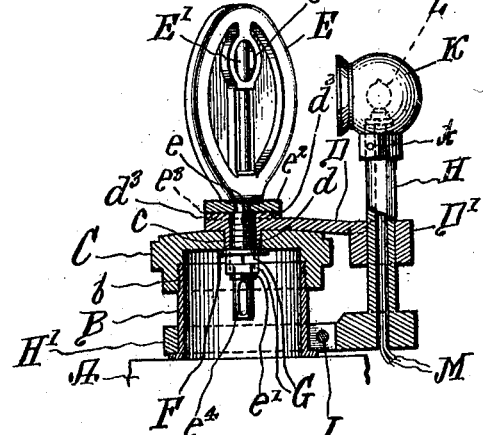
Figure 4 shows a section along the line 4—4 of Figure 3, and looking in the direction of the arrows.
Figure 3:
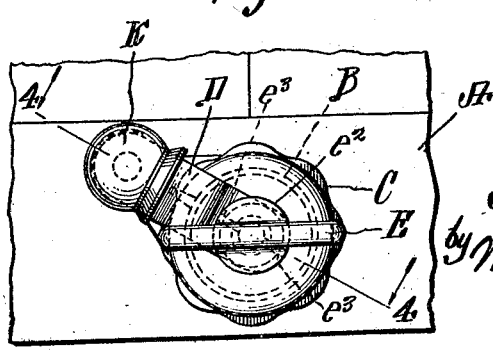
Figure 3 is a plan view of the device shown in Figure 2.

A represents the radiator of an automobile, which may be of any standard or preferred type. This radiator is provided with the usual filling opening having the tubular neck B, which is screw-threaded as at $b$ to engage the screw-threaded cap C. This cap is centrally perforated as at $c$ to receive the hollow trunnion $d$ of the arm D, through which passes the stem $e$ of the thermometer attachment E, commonly called the "motometer." This stem is screw-threaded as at $e'$ to engage the lock nuts G, the upper one of which nuts engages a suitable washer F.

In order to prevent the frame E from turning on the arm D, I provide lugs $d^3$ (see Fig. 9), which engage corresponding notches $e^3$ in the flange $e^2$ at the base of the frame E. This frame E is perforated as at $e^0$ to show the thermometer E'. The motometer stem $e$ is slotted near its bottom $e^4$ to properly expose the bulb of the thermometer.

The arm D is provided with a tubular boss D', which is slidable on the stem H, which stem is secured to or integral with the bracket H', which fits over and is clamped on the tube B, as by means of the clamp screw I. This bracket is made to fit snugly on the tube B and to be clamped thereon in the desired position as by means of the screw I.

The stem H carries at its upper end a lamp chamber K containing a small electric lamp L, which may be used to illuminate the thermometer at night, and also to aid in filling the radiator tank with liquid. This lamp chamber K may be secured to the stem H in any convenient way, as by means of the set screw $k$. The stem H is made hollow to receive the leading-in wires M connected to the lamp L.

It will be seen that in unscrewing the cap

C for opening the radiator tank, the arm D is caused to slide up on the stem H until the parts assume the position shown in Figure 5, when this arm D carrying the cap and thermometer attachment may be swung out of the way to permit the convenient filling of the radiator tank with liquid, but at the same time these parts will be held against removal from the automobile and will also be protected against injury while being manipulated in the manner stated.

Of course, these parts could be removed by the use of special tools, but an appliance of this kind is not intended to be burglar-proof, it is only for protection against the expected carelessness on the part of the operator, or against ordinary thieves.

It will be obvious that various modifications might be made in the herein-described apparatus, and in the construction, combination and arrangement of parts, which could be used without departing from the spirit of my invention, and I do not mean to limit the invention to such details, except as particularly pointed out in the claims.

Having thus described my invention, what I claim and desire to secure by Letters Patent of the United States is:

1. An attachment for automobiles provided with a radiator and a neck for filling same, comprising a screw cap adapted to screw over and close said neck, a bracket clamped to said neck and provided with a laterally projecting lug, a hollow stem projecting upwards from said lug, an electric light carried by said stem and having its leading-in wires enclosed therein, and an arm swiveled near one end to said cap and slidably and rotatably mounted upon said stem, and serving to tie said cap to said stem, substantially as described.

2. An attachment for automobiles provided with a radiator and a neck for filling same, comprising a screw cap adapted to screw over and close said neck, a bracket clamped to said neck and provided with a laterally projecting lug, a hollow stem projecting upwards from said lug, an electric light carried by said stem and having its leading-in wires enclosed therein, and an arm swiveled near one end to said cap and slidably and rotatably mounted upon said stem, and serving to tie said cap to said stem, and a thermometer frame mounted on said arm over said cap and projecting down through said cap, substantially as described.

3. An attachment for automobiles provided with a radiator and a neck for filling same, comprising a screw cap adapted to screw over and close said neck, a bracket clamped to said neck and provided with a laterally projecting lug, a hollow stem projecting upwards from said lug, an electric light carried by said stem and having its leading-in wires enclosed therein, and an arm swiveled near one end to said cap and slidably and rotatably mounted upon said stem, and serving to tie said cap to said stem, a thermometer frame mounted on said arm over said cap and projecting down through said cap, with means for holding cap against turning on said arm.

JOHN T. BLUFF.